(12) United States Patent
Sanchez Rola et al.

(10) Patent No.: US 11,449,637 B1
(45) Date of Patent: Sep. 20, 2022

(54) SYSTEMS AND METHODS FOR PROVIDING WEB TRACKING TRANSPARENCY TO PROTECT USER DATA PRIVACY

(71) Applicant: NortonLifeLock Inc., Tempe, AZ (US)

(72) Inventors: Iskander Sanchez Rola, Antibes (FR); Leyla Bilge, Antibes (FR); Pierre-Antoine Vervier, Cagnes-sur-Mer (FR); David Luz Silva, Dublin (IE)

(73) Assignee: NortonLifeLock Inc., Tempe, AZ (US)

( * ) Notice: Subject to any disclaimer, the term of this patent is extended or adjusted under 35 U.S.C. 154(b) by 171 days.

(21) Appl. No.: 16/901,935

(22) Filed: Jun. 15, 2020

(51) Int. Cl.
  *G06F 7/04* (2006.01)
  *G06F 21/62* (2013.01)
  *H04L 67/146* (2022.01)
  *H04L 67/50* (2022.01)

(52) U.S. Cl.
  CPC ........ *G06F 21/6263* (2013.01); *H04L 67/146* (2013.01); *H04L 67/535* (2022.05)

(58) Field of Classification Search
  CPC ....... H04L 67/22; H04L 67/02; H04L 67/146; G06Q 30/0255; G06Q 30/0269; H04N 21/25891; H04W 12/02; H04W 8/16; H04W 4/029; G06F 16/955; G06F 16/951; G06F 11/3438; G06F 2201/86; G06F 21/6263
  USPC ........................................................ 726/30
  See application file for complete search history.

(56) References Cited

U.S. PATENT DOCUMENTS

| | | | | |
|---|---|---|---|---|
| 2018/0121559 | A1* | 5/2018 | Bare | G06F 16/252 |
| 2020/0272763 | A1* | 8/2020 | Brannon | G06F 21/604 |
| 2021/0382949 | A1* | 12/2021 | Yastrebenetsky | G06F 16/951 |
| 2021/0397679 | A1* | 12/2021 | Benkreira | G06F 16/986 |

OTHER PUBLICATIONS

S. Yu, D. V. Vargas and K. Sakurai, "Effectively Protect Your Privacy: Enabling Flexible Privacy Control on Web Tracking," 2017 Fifth International Symposium on Computing and Networking (CANDAR), 2017, pp. 533-536, (Year: 2017).*

(Continued)

*Primary Examiner* — Taylor A Elfervig
(74) *Attorney, Agent, or Firm* — FisherBroyles, LLP (57) ABSTRACT

The disclosed computer-implemented method for providing web tracking transparency to protect user data privacy may include (i) receiving a browser request for target websites during a browsing session, (ii) identifying a tracking type for website trackers utilized by the target websites, the tracking type including a direct tracking type or a tracking sharing type, (iii) extracting an information category for the target websites, (iv) detecting text patterns shared between the target websites in a common information category, (v) determining information collected about a user by the website trackers by combining the tracking type for the website trackers, the information category for the target websites, and the detected text patterns, and (v) performing a security action that protects against unsolicited website tracking in future browsing sessions by providing the information collected by the website trackers to the user. Various other methods, systems, and computer-readable media are also disclosed.

20 Claims, 7 Drawing Sheets

(56) References Cited

OTHER PUBLICATIONS

A. Aladeokin, P. Zavarsky and N. Memon, "Analysis and compliance evaluation of cookies-setting websites with privacy protection laws," 2017 Twelfth International Conference on Digital Information Management (ICDIM), 2017, pp. 121-126 (Year: 2017).*

J. Estrada-Jimenez, A. Rodriguez-Hoyos, J. Parra-Arnau and J. Forné, "Measuring Online Tracking and Privacy Risks on Ecuadorian Websites," 2019 IEEE Fourth Ecuador Technical Chapters Meeting (ETCM), 2019, pp. 1-6 (Year: 2019).*

E. Shuford et al., "Measuring Personal Privacy Breaches Using Third-Party Trackers," 2018 17th IEEE International Conference On Trust, Security And Privacy In Computing And Communications/ 12th IEEE International Conference On Big Data Science And Engineering, 2018, p. 1615-1618 (Year: 2018).*

W. Jiang, X. Wang, X. Song, Q. Liu and X. Liu, "Tracking your browser with high-performance browser fingerprint recognition model," in China Communications, vol. 17, No. 3, pp. 168-175, Mar. 2020 (Year: 2020).*

O. Seneviratne and L. Kagal, "Enabling privacy through transparency," 2014 Twelfth Annual International Conference on Privacy, Security and Trust, 2014, pp. 121-128 (Year: 2014).*

P. J. Mudialba, S. Nair and J. Ma, "Finger printing on the web," 2017 IEEE 8th Annual Ubiquitous Computing, Electronics and Mobile Communication Conference (UEMCON), 2017, pp. 475-477 (Year: 2017).*

J. R. Mayer and J. C. Mitchell, "Third-Party Web Tracking: Policy and Technology," 2012 IEEE Symposium on Security and Privacy, 2012, pp. 413-427 (Year: 2012).*

N. Kaur, S. Azam, K. Kannoorpatti, K. C. Yeo and B. Shanmugam, "Browser Fingerprinting as user tracking technology," 2017 11th International Conference on Intelligent Systems and Control (ISCO), 2017, pp. 103-111 (Year: 2017).*

S. Luangmaneerote et al, "Inhibiting Browser Fingerprinting and Tracking," 2017 ieee 3rd international conference on big data security on cloud (bigdatasecurity), (hpsc), (ids), 2017, pp. 63-68 (Year: 2017).*

Chairani et al., "By the user, for the user: A user-centric approach to quantifying the privacy of websites", Arxiv, Cornell University, p. 1-7, 2019 (Year: 2019).*

Guha, Neel, "Semantic Identification of Web Browsing Sessions", Arxiv, Cornell University, p. 1-14, 2017 (Year: 2017).*

I. Castell-Uroz, J. Solé-Pareta and P. Barlet-Ros, "TrackSign: Guided Web Tracking Discovery," IEEE INFOCOM 2021—IEEE Conference on Computer Communications, 2021, pp. 1-10 (Year: 2020).*

Puglisi, D. Rebollo-Monedero and J. Forné, "On Web user tracking: How third-party http requests track users' browsing patterns for personalised advertising," 2016 Mediterranean Ad Hoc Networking Workshop (Med-Hoc-Net), 2016, pp. 1-6, (Year: 2016).*

Puglisi, S., Rebollo-Monedero, D., Forné, J. (2016). You Never Surf Alone. Ubiquitous Tracking of Users' Browsing Habits. In: Garcia-Alfaro, J., Navarro-Arribas, G., Aldini, A., Martinelli, F., Suri, N. (eds) Data Privacy Management, and Security Assurance. , 2015. Computer Science vol. 9481, p. 1-8 (Year: 2015).*

Bugliesi, M., Calzavara, S., Focardi, R., Khan, W. (2014). Automatic and Robust Client-Side Protection for Cookie-Based Sessions. In: Jürjens, J., Piessens, F., Bielova, N. (eds) Engineering Secure Software and Systems. ESSoS 2014. Lecture Notes in Computer Science, vol. 8364. Springer (Year: 2014).*

C. Deußer, S. Passmann and T. Strufe, "Browsing Unicity: On the Limits of Anonymizing Web Tracking Data," 2020 IEEE Symposium on Security and Privacy (SP), 2020, pp. 777-790 (Year: 2020).*

G. Merzdovnik et al., "Block Me If You Can: A Large-Scale Study of Tracker-Blocking Tools," 2017 IEEE European Symposium on Security and Privacy (EuroS&P), 2017, pp. 319-333 (Year: 2017).*

T. Bujlow, V. Carela-Español, J. Solé-Pareta and P. Barlet-Ros, "A Survey on Web Tracking: Mechanisms, Implications, and Defenses," in Proceedings of the IEEE, vol. 105, No. 8, pp. 1476-1510, Aug. 2017 (Year: 2017).*

Bujilow et al, "Web Tracking: Mechanisms, Implications, and Defenses", Arxiv, Cornell University, p. 1-29, 2015 (Year: 2015).*

* cited by examiner

SYSTEMS AND METHODS FOR PROVIDING WEB TRACKING TRANSPARENCY TO PROTECT USER DATA PRIVACY

BACKGROUND

Internet browsing activities, including accessing websites over enterprise and home computer networks, often include web tracking during browsing sessions that may compromise user privacy by maintaining and/or utilizing private user data. For example, content (such as an advertisement), being viewed on a website by a user may include a website tracker configured to store identifying information (e.g., a user's browsing history or contact information) in a browser cookie or as a fingerprint on a local storage device so that when the same content is loaded by a different website, the website tracker may continue serving the user with additional targeted advertising or other content without the user's consent and potentially in violation of various data protection laws such as the European Union's General Data Protection Regulation ("GPDR").

Traditional methods for addressing data privacy violations due to web tracking include enhancing web browser functionality and/or providing web browser extensions that generate basic statistics indicating a percentage or number of data privacy leaks detected during user browsing sessions. However, these traditional methods fail to provide users with specific information as to what each website tracker knows about them. That is, users are not made aware of the specific content obtained by the website trackers.

SUMMARY

As will be described in greater detail below, the present disclosure describes various systems and methods for providing web tracking transparency to protect user data privacy.

In one example, a method for providing web tracking transparency to protect user data privacy may include (i) receiving a browser request for one or more target websites during a browsing session, (ii) identifying a tracking type for one or more website trackers utilized by the target websites during the browsing session, the tracking type including at least one of a direct tracking type and a tracking sharing type, (iii) extracting an information category for the target websites utilizing the website trackers during the browsing session, (iv) detecting text patterns shared between the target websites in a common information category, (v) determining information collected about a user by the website trackers during the browsing session by combining the tracking type for the website trackers, the information category for the target website, and the text patterns, and (vi) performing a security action that protects against unsolicited website tracking in future browsing sessions by providing the information collected by the website trackers during the browsing session to the user.

In some examples, the tracking type for the website trackers may be identified by (i) utilizing a browser extension to detect program code executed by the website trackers in the target websites and (ii) identifying the tracking type based on the detected program code. In some embodiments, the browser extension may be utilized to manage one or more application programming interfaces (APIs) accessible to the browser extension. In some embodiments, the detected program code may be analyzed to identify one or more parties involved in creating a browser cookie for identifying the user. In other embodiments, the detected program code may be analyzed to identify one or more parties involved in creating a browser fingerprint for identifying the user. In still other embodiments, the detected program code may be analyzed to identify a shared identifier between the website trackers for the target websites and another website tracker for at least one other website. In one example, the shared identifier may be identified by tracking a cookie flow between a web browser receiving the browser request and a server during the browsing session. In one example, the at least one other website may be a website that is not directly loaded by the user during the browsing session.

In some examples, the text patterns shared between the target websites may be detected by identifying one or more terms utilized in content accessed by the user on the target websites within the common information category. In some embodiments, the security action may be performed by generating a web tracking transparency report including the direct tracking type and/or the tracking sharing type, the information category, and the text patterns for the target websites.

In one embodiment, a system for providing web tracking transparency to protect user data privacy may include at least one physical processor and physical memory comprising computer-executable instructions and one or more modules that, when executed by the physical processor, cause the physical processor to (i) receive, by a receiving module, a browser request for one or more target websites during a browsing session, (ii) identify, by an identification module, a tracking type for one or more website trackers utilized by the target websites during the browsing session, the tracking type including at least one of a direct tracking type and a tracking sharing type, (iii) extract, by an extraction module, an information category for the target websites utilizing the website trackers during the browsing session, (iv) detect, by a detection module, text patterns shared between the target websites in a common information category, (v) determine, by a determining module, information collected about a user by the website trackers during the browsing session by combining the tracking type for the website trackers, the information category for the target website, and the text patterns, and (vi) perform, by a security module, a security action that protects against unsolicited website tracking in future browsing sessions by providing the information collected by the website trackers during the browsing session to the user.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive a browser request for one or more target websites during a browsing session, (ii) identify a tracking type for one or more website trackers utilized by the target websites during the browsing session, the tracking type including at least one of a direct tracking type and a tracking sharing type, (iii) extract an information category for the target websites utilizing the website trackers during the browsing session, (iv) detect text patterns shared between the target websites in a common information category, (v) determine information collected about a user by the website trackers during the browsing session by combining the tracking type for the website trackers, the information category for the target websites, and the detected text patterns, and (vi) perform a security action that protects against unsolicited website tracking in future browsing sessions by providing the information collected by the website trackers during the browsing session to the user.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for providing web tracking transparency to protect user data privacy. As will be described in greater detail below, by providing a browser extension to communicate directly with website trackers, the systems and methods described herein may enable the collection of data (including the identification of trackers and shared trackers, visited website categories, and shared text patterns between visited websites of the same category) during user web browsing sessions, thereby allowing the user to identify specific information, including private data, that any website tracker knows about them.

In addition, the systems and methods described herein may improve computer network security by generating a report identifying website trackers involved in obtaining user private data during user web browsing sessions, thereby enabling the institution of remedial security measures against these website trackers to prevent reoccurrence during future browsing sessions and to further prevent attacks (e.g., phishing attacks) based on user browsing behavior by malicious third parties utilizing the private data.

Figure 1:
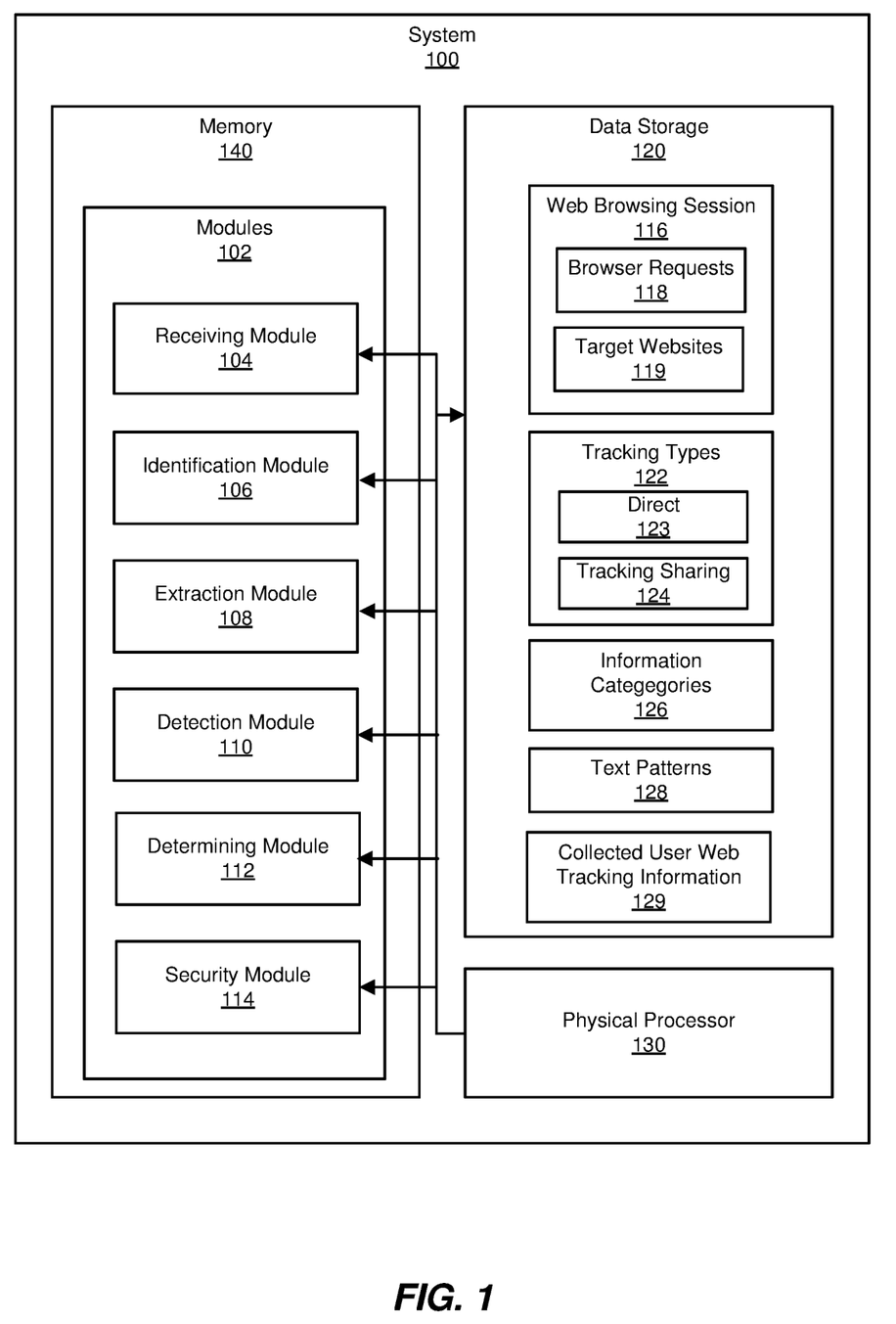
FIG. 1 is a block diagram of an example system for providing web tracking transparency to protect user data privacy.
Figure 2:
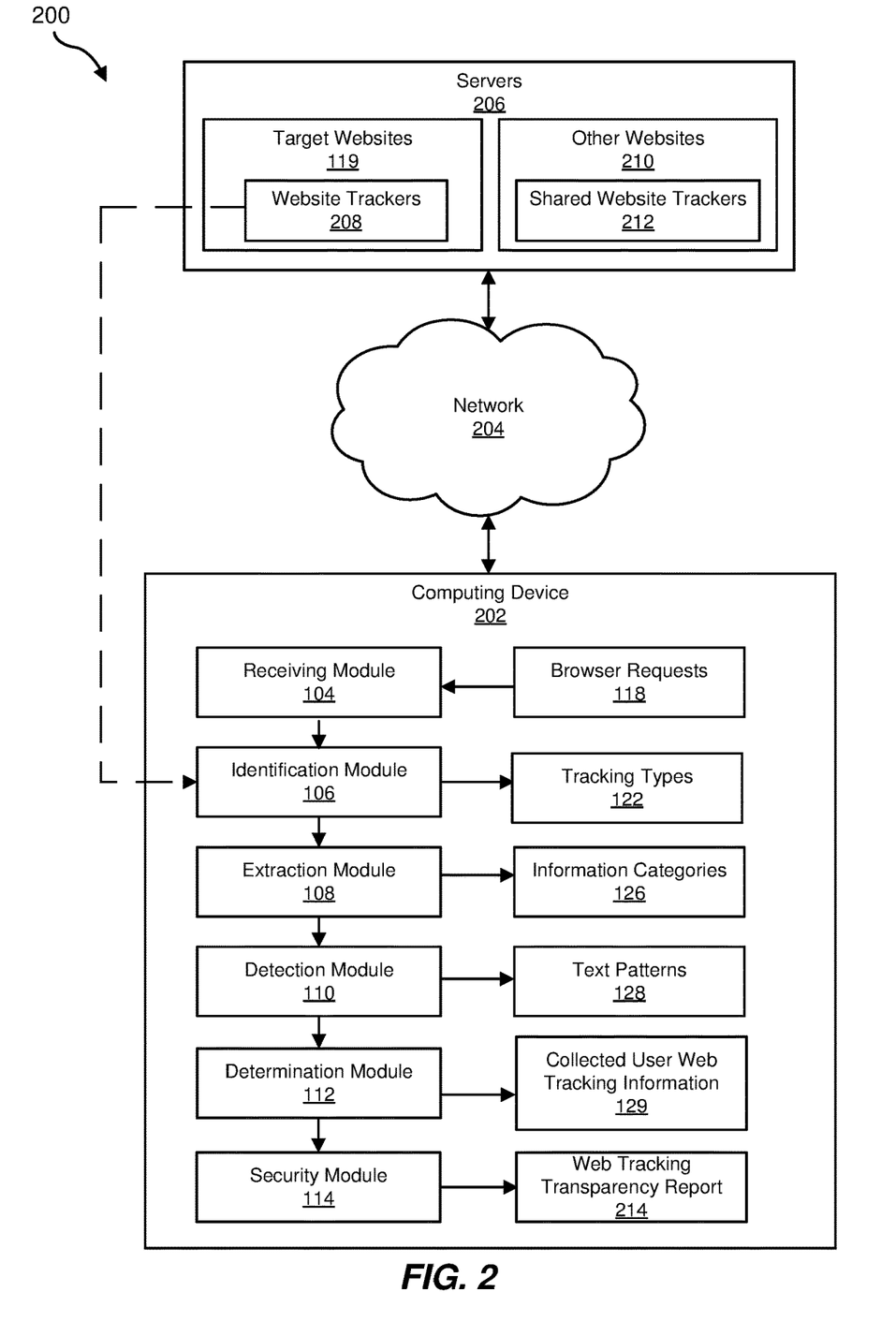
FIG. 2 is a block diagram of an additional example system for providing web tracking transparency to protect user data privacy.

The following will provide, with reference to FIGS. 1-2, detailed descriptions of example systems for providing web tracking transparency to protect user data privacy. Detailed descriptions of corresponding computer-implemented methods will also be provided in connection with FIG. 3. A detailed description of an example system for identifying website tracker data utilizing one or more browser extensions will also be provided in connection with FIG. 4. In addition, a detailed description of a web transparency report generated by an example system for providing web tracking transparency to protect user data privacy, will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for providing web tracking transparency to protect user data privacy. As illustrated in this figure, example system 100 may include one or more modules 102 for performing one or more tasks. As will be explained in greater detail below, modules 102 may include a receiving module 104 that receives browser requests 118 for target websites 119 during a web browsing session 116. Example system 100 may additionally include an identification module 106 that identifies tracking types 122 for website trackers utilized by target websites 119 during web browsing session 116. Tracking types 122, which may include direct 123 and tracking sharing 124, will be described in greater detail below in the description of FIG. 3. Example system 100 may also include an extraction module 108 that extracts information categories 126 for target websites 119 during web browsing session 116. Example system 100 may additionally include a detection module 110 that detects text patterns shared between target websites 119 in common information categories 126. Example system 100 may also include a determining module 112 that determines information collected about a user by website trackers during web browsing session 116 by combining tracking types 122, information categories 126, and text patterns 128 (i.e., collected user web tracking information 129). Example system 100 may additionally include a security module 114 that performs a security action that protects against unsolicited website tracking in future browsing sessions by providing collected user web tracking information 129 during browsing session 116 to a user. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or servers 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate providing web tracking transparency to protect user data privacy. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include a data storage 120 for storing data. In one example, data storage 120 may store web browsing session 116 including browser requests 118 and target websites 119. Data storage 120 may also store tracking types 122 (e.g., tracking type identification data) including direct 123 and tracking sharing 124. Data storage 120 may further store information categories 126, text patterns 128, and collected user web tracking information 129.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, servers 206, and/or any other suitable computing system. As will be described in greater detail below, one or more of modules 102 from FIG. 1 may, when executed by at least one processor of computing device 202 and/or server 206, enable computing device 202 and/or servers 206 to provide web tracking transparency to protect user data privacy.

For example, receiving module 104 may receive a browser request 118 for one or more target websites 119. Then, identification module 106 may identify a tracking type 122 for one or more website trackers 208 utilized by target websites 119. Next, extraction module 108 may extract an information category 126 for target websites 119 utilizing website trackers 208. Then, detection module 110 may detect text patterns 128 shared between target websites 119 in a common information category 126. Next, determining module 112 may determine collected user web tracking information 129 by combining tracking types 122, information categories 126, and text patterns 128 obtained from website trackers 208. Finally, security module 114 may perform a security action that protects against unsolicited website tracking in future browsing sessions by providing collected user web tracking information 129, in the form of a web tracking transparency report 214, to the user.

Computing device 202 generally represents any type or form of computing device capable of reading computer-executable instructions. In some examples, computing device 202 may be an endpoint device running client-side security software including online privacy protection in connection with user web browsing sessions. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Servers 206 generally represent any type or form of computing device that is capable of servicing user website requests from one or more client devices. In some examples, each of servers 206 may represent a plurality of servers that work and/or operate in conjunction with one another. Additional examples of servers 206 include, without limitation, security servers, application servers, web servers, storage servers, and/or database servers configured to run certain software applications and/or provide various security, web, storage, and/or database services.

Network 204 generally represents any medium or architecture capable of facilitating communication or data transfer. In one example, network 204 may facilitate communication between computing device 202 and servers 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
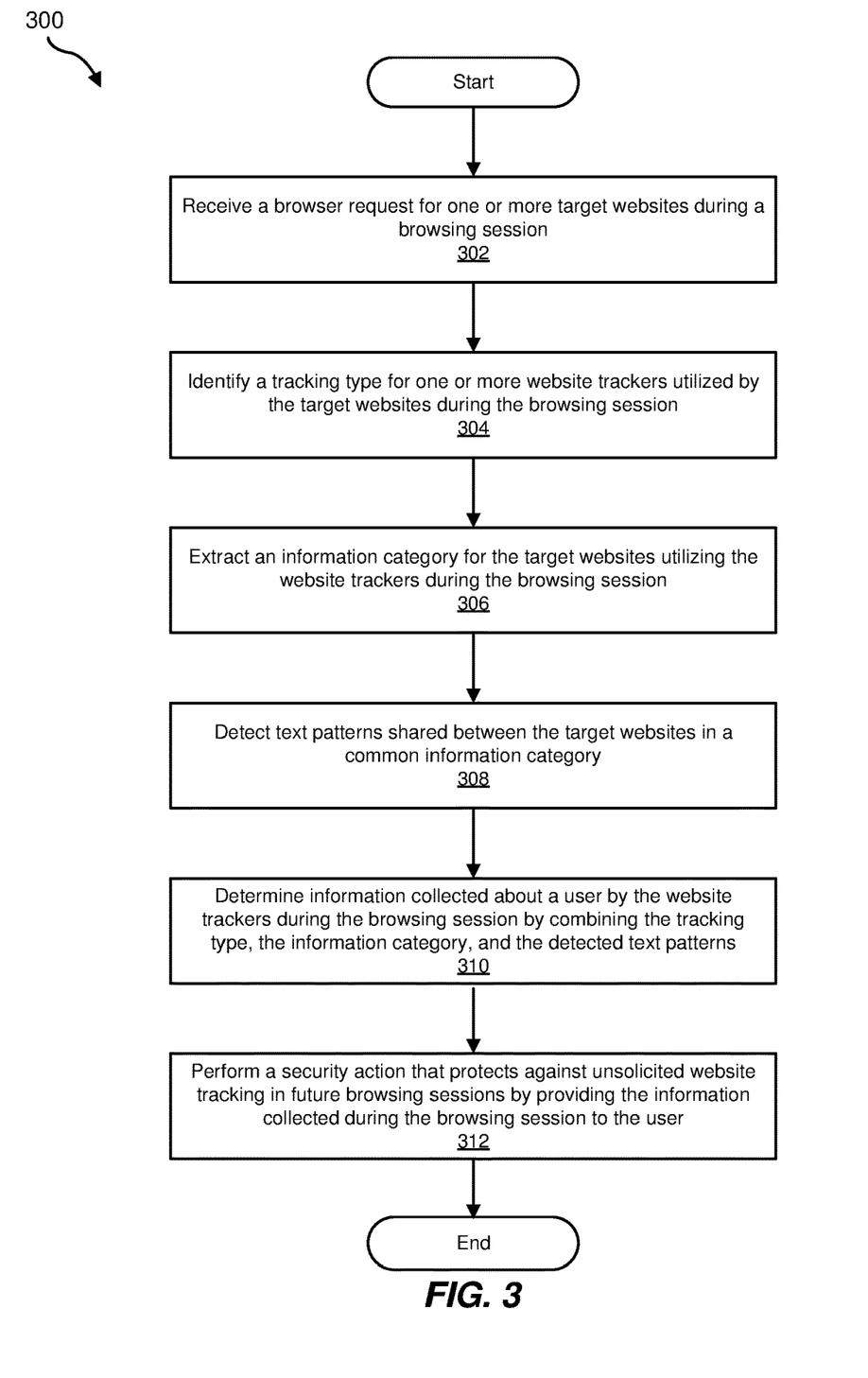
FIG. 3 is a flow diagram of an example method for providing web tracking transparency to protect user data privacy.

FIG. 3 is a flow diagram of an example computer-implemented method 300 for providing web tracking transparency to protect user data privacy. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive a browser request for one or more target websites during a browsing session. For example, receiving module 104 may, as part of computing device 202 in FIG. 2, receive browser requests 118 for target websites 119 during web browsing session 116.

The term "target website," as used herein, generally refers to any website, requested by a user in a web browser, that is directly loaded onto a client computing device for viewing content therein. For example, a user may open a web browser to initiate a browsing session and enter a website address corresponding to a news website in a browser address bar.

The term "browsing session," as used herein, generally refers to any temporary and interactive information interchange between two or more communicating devices over a network (e.g., the Internet). For example, a user of a client computing device may use a web browser application to initiate a connection to a web server for accessing a website for viewing and/or exchanging data.

Receiving module 104 receive may receive browser requests 118 in a variety of ways. In some embodiments, receiving module 104 may receive browser requests 118 for one or more target websites 119 stored on servers 206. Upon receiving browser requests 118, computing device 202 may then load target websites 119 from servers 206 for the viewing of and/or interaction with content therein by a user.

At step 304, one or more of the systems described herein may identify a tracking type for one or more website trackers utilized by the target websites during the browsing session. For example, identification module 106, may, as part of computing device 202 in FIG. 2, identify tracking types 122 for website trackers 208 utilized by target websites 119 during web browsing session 116. In some embodiments, tracking types 122 may include a direct tracking type (i.e., direct 123) and a tracking sharing type (i.e., tracking sharing 124).

The term "website tracker," as used herein, generally refers to third-party executable program code loaded by a browser from external websites, that appears on web pages as content for viewing by a user. Upon being loaded by a browser, a website tracker may generate tracking data (e.g., an Internet tracking cookie) as well as access previous tracking data, saved by the browser, corresponding to a user's browsing activity on a website. For example, a user may visit the website example.org containing content from ad.tracking.com which, when downloaded, sets a tracking cookie belonging to the content provider's domain. When the user visits another website (e.g., foo.com), which also contains content from ad.tracking.com, another tracking cookie is set and both cookies (containing the user's previous and current browsing activity) may be sent to the content provider when loading their content or visiting their website.

Identification module 106 may identify tracking types 122 in a variety of ways. In some examples, identification module 106 may be configured to detect different types of website tracking that can occur in a web browsing session. In some embodiments, identification module 106 may be configured to detect a direct tracking type (i.e., direct 123) and a tracking sharing type (i.e., tracking sharing 124) by utilizing a browser extension to detect program code executed by website trackers 208 and then identifying tracking types 122 based on the detected program code.

Figure 4:
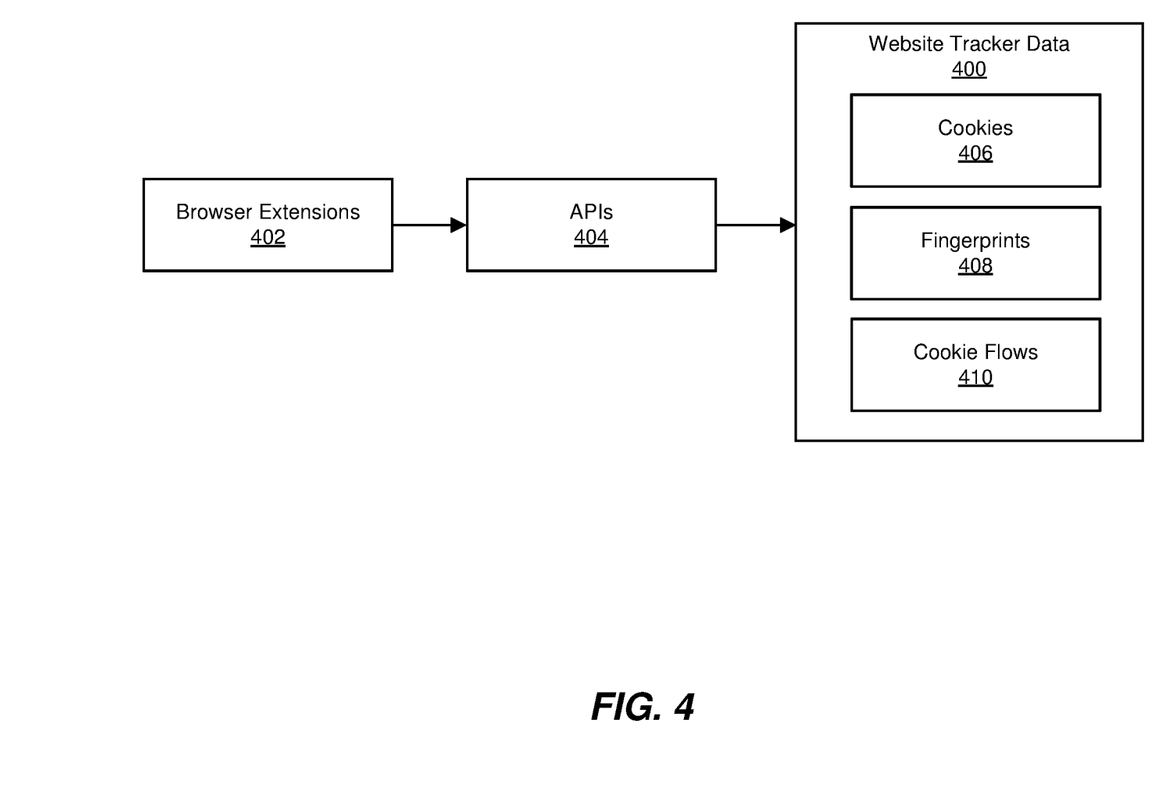
FIG. 4 is a block diagram of an example system for identifying website tracker data utilizing one or more browser extensions.

For example, and as shown in FIG. 4, browser extensions 402 may be utilized to identify tracking types 122 by managing various application programming interfaces (such as APIs 404) that browser extensions 402 have access to. In one embodiment, a browser extension 402 may be utilized that executes certain functions and communications to obtain various types of data. In one example, a browser extension 402 may utilize a web development tools (devtools) interface to control all of the requests performed by a website resulting in an understanding of the various interactions between requested resources. Moreover, browser extensions 402 may also utilize content scripts to hook functions in the context of web pages as well as follow the document object model (DOM) standard utilized by web browsers. In some embodiments, browser extensions 402 may be utilized to detect a direct tracking type by keeping track of all of a number of different internal and external parties involved in the creation of website tracker data 400 including the creation of cookies 406 and fingerprints 408 (i.e., browser fingerprints utilized to compile records of a user's web browsing histories, deliver targeted advertising, etc.) that may be used by website trackers 208 to identify a user in subsequent browser requests 118. Additionally or alternatively, browser extensions 402 may be utilized to detect a tracking sharing type by identifying website trackers 208 that share identifiers with other website trackers (e.g., shared website trackers 212) thereby enabling the other website trackers to track users in websites in which they are not directly loaded. In some embodiments, the detection of the tracking sharing type may be performed through the use of cookie flows 410. In one example, browser extensions 402 may be utilized to monitor the creation of cookie flows 410 and identify anomalies that result in the creation of identifiers (such as those utilized by tracking sharing type website trackers). In another example, browser extensions 402 may be utilized to identify (e.g., classify) the different types of cookies that are being created on websites. In this example, cookie generation flows, cookie content, and cookie sharing flows may be utilized. In some embodiments, the cookie sharing flows may be an extension of the cookie generation flows. For example, each of a number of different requests that share cookies (e.g., included in a Hypertext Transfer Protocol (HTTP) POST, in a cookie header, or embedded in a uniform resource locator (URL)) may be tracked which create their own flows. Given these cookie flows and its content, cookies may be classified as different general categories in addition to obtaining more fine-grained classifications. In some embodiments, browser extensions 402 may utilize the devtools network interface in combination with content scripts (discussed above) and follow the DOM standard to uncover what is happening regarding cookie generation flows (in addition to supervising and controlling the cookie generation flows).

Returning now to step 306 of FIG. 3, one or more of the systems described herein may extract an information category for the target websites utilizing the website trackers during the browsing session. For example, extraction module 108, may, as part of computing device 202 in FIG. 2, extract information categories 126 for target websites 119. In some embodiments, information categories 126 may include a website category for a target website 119 (e.g., news, health, entertainment etc.).

Extraction module 108 may extract information categories 126 in a variety of ways. In some embodiments, extraction module 108 identify information categories 126 based on data obtained (e.g., cookies or browser fingerprints) from identifying tracking types 122 for target websites 119.

At step 308, one or more of the systems described herein may detect text patterns shared between the target websites in a common information category. For example, detection module 110, may, as part of computing device 202 in FIG. 2, detect text patterns 128 shared between target websites 119 in a common information category 126.

Detection module 110 may detect text patterns 128 in a variety of ways. In some embodiments, detection module 110 may be configured to utilize natural language processing (NLP) to identify terms utilized in content accessed by a user on target websites 119 in the same information category. For example, detection module 110 may utilize NLP to detect the term "Brexit" on multiple target websites 119 that all belong to a news category.

At step 310, one or more of the systems described herein may determine information collected about a user by the website trackers during the browsing session by combining the tracking type, the information category, and the detected text patterns. For example, determining module 112, may, as part of computing device 202 in FIG. 2, determine collected user web tracking information 129 by combining tracking types 122, information categories 126, and text patterns 128 for each of website trackers 208.

Determining module 112 may determine collected user web tracking information 129 in a variety of ways. In some embodiments, determining module 112 may associate a single website tracker 208 for an identified tracking type 122 (e.g., direct 123 or tracking sharing 124) utilized on a group of target websites 119 in a common information category 126 and then associate detected text patterns 128 with the group. For example, a direct tracking type analytics website tracker may be utilized on a group of three different news websites on which a user accessed content corresponding to the detected text pattern "Brexit" during a browsing session. As another example, a tracking sharing tracking type website tracker may be utilized on a website that was not directly loaded by a user but which knows the user accessed content corresponding to the detected text pattern "Brexit" via sharing with an analytics website tracker on a news website where the user actually accessed the content.

At step 312, one or more of the systems described herein may perform a security action that protects against unsolicited website tracking in future browsing sessions by providing the information collected during the browsing session to the user. For example, security module 114, may, as part of computing device 202 in FIG. 2, perform a security action that generates web tracking transparency report 214 incorporating collected user web tracking information 129.

Security module 114 may generate web transparency report 214 in a variety of ways. In some embodiments, security module 114 may generate a report including information associated with tracking types 122, information categories 126, and text patterns 128 associated with each of a number of website trackers 208 and, if applicable, any shared website trackers 212.

Figure 5:
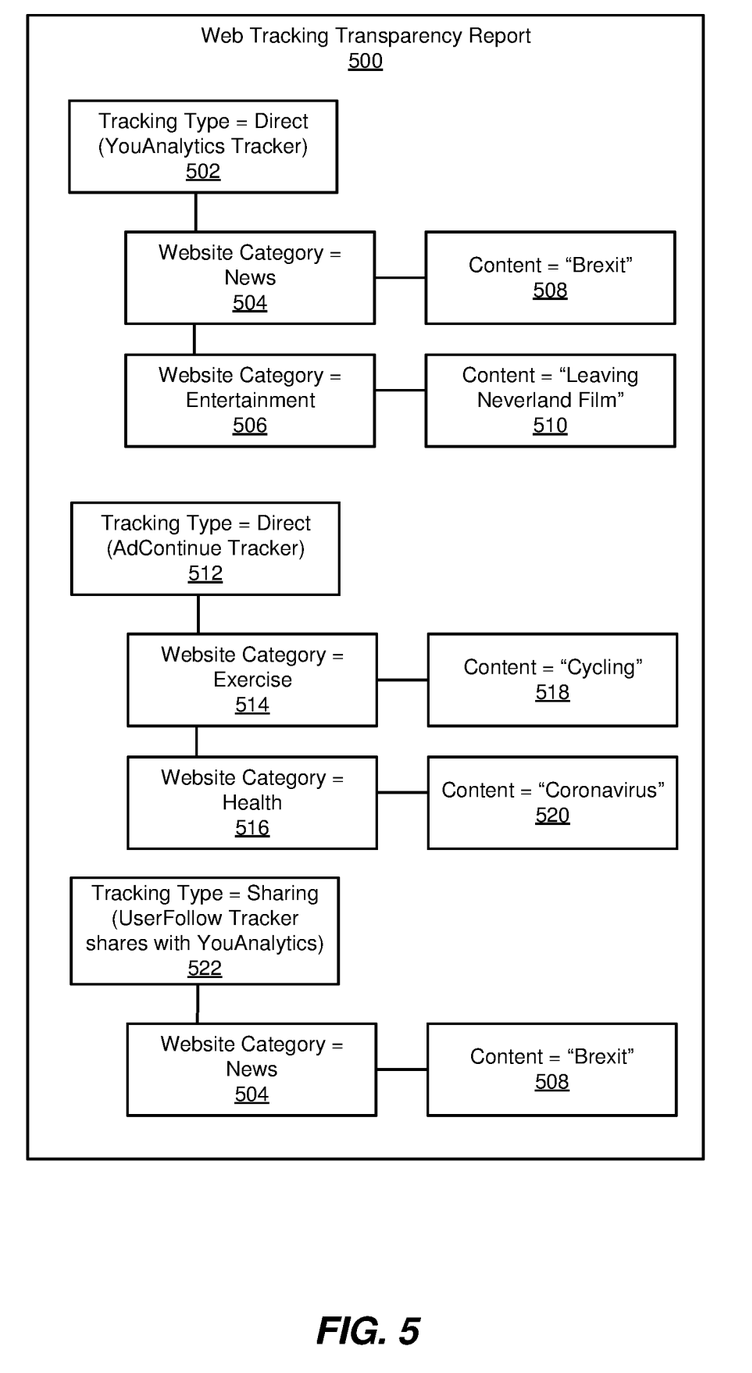
FIG. 5 is a block diagram of a web transparency report generated by an example system for providing web tracking transparency to protect user data privacy.

For example, and as shown in FIG. 5, a web tracking transparency report 500 that generated by security module 114 may include a direct tracking type identification 502 for an analytics tracker (i.e., "YouAnalytics Tracker") utilized on news websites (i.e., website category 504) and entertainment websites (i.e., website category 506) on which a user, based on detected text patterns, accessed content associated with "Brexit" (i.e., content 508) and the film "Leaving Neverland (i.e., content 510)," respectively. Continuing with this example, web tracking transparency report 500, generated by security module 114, may include a direct tracking type identification 512 for an ad tracker (i.e., "AdContinue Tracker") utilized on exercise websites (i.e., website category 514) and health websites (i.e., website category 516) on which a user, based on detected text patterns, accessed content associated with "Cycling" (i.e., content 518) and "Coronavirus (i.e., content 520)," respectively. Furthermore, web tracking transparency report 500, generated by security module 114, may also include a tracking sharing tracking type identification 522 for website tracker (i.e., "UserFollow") that shares with another website tracker (i.e., "You Analytics"). For this entry in web tracking transparency report 500, the website tracker UserFollow knows website category 504 (i.e., news) and content 508 (i.e., "Brexit") that was obtained by the YouAnalytics tracker. As discussed above, the UserFollow website tracker may be associated with websites that are not directly loaded by a user during a browsing session.

As explained in connection with method 300 above, the systems and methods described herein provide an advanced tracking transparency technique for users of web browsers that enables them to obtain specific data collected about them by website trackers. This data may be obtained directly by the website trackers themselves (e.g., through the execution of their in multiple websites) or through inter-tracker data sharing between website trackers. The data may be obtained using a browser extension that executes certain functions and communications. In particular, the systems and methods described herein may be utilized to manage different APIs that one or more browser extensions have access to. For example, a devtools network interface may be utilized to control website requests and to better understand the interactions between requested website resources. Moreover, the systems and methods described herein may also benefit from content scripts to hook functions in the context of web pages. Additionally, by following the DOM standard, the systems and methods described herein may not only uncover cookie generation flows but may also supervise and control these flows. Finally, by utilizing direct tracking, tracking sharing, website category identification, and term detection, the systems and methods described herein may generate a detailed report (e.g., a web transparency report) for a user combining the complete set of website trackers that obtained visibility on a given visited topic on multiple websites by a user and further highlight which kind of personal information may have been compromised and shared among all of the set of website trackers.

Figure 6:
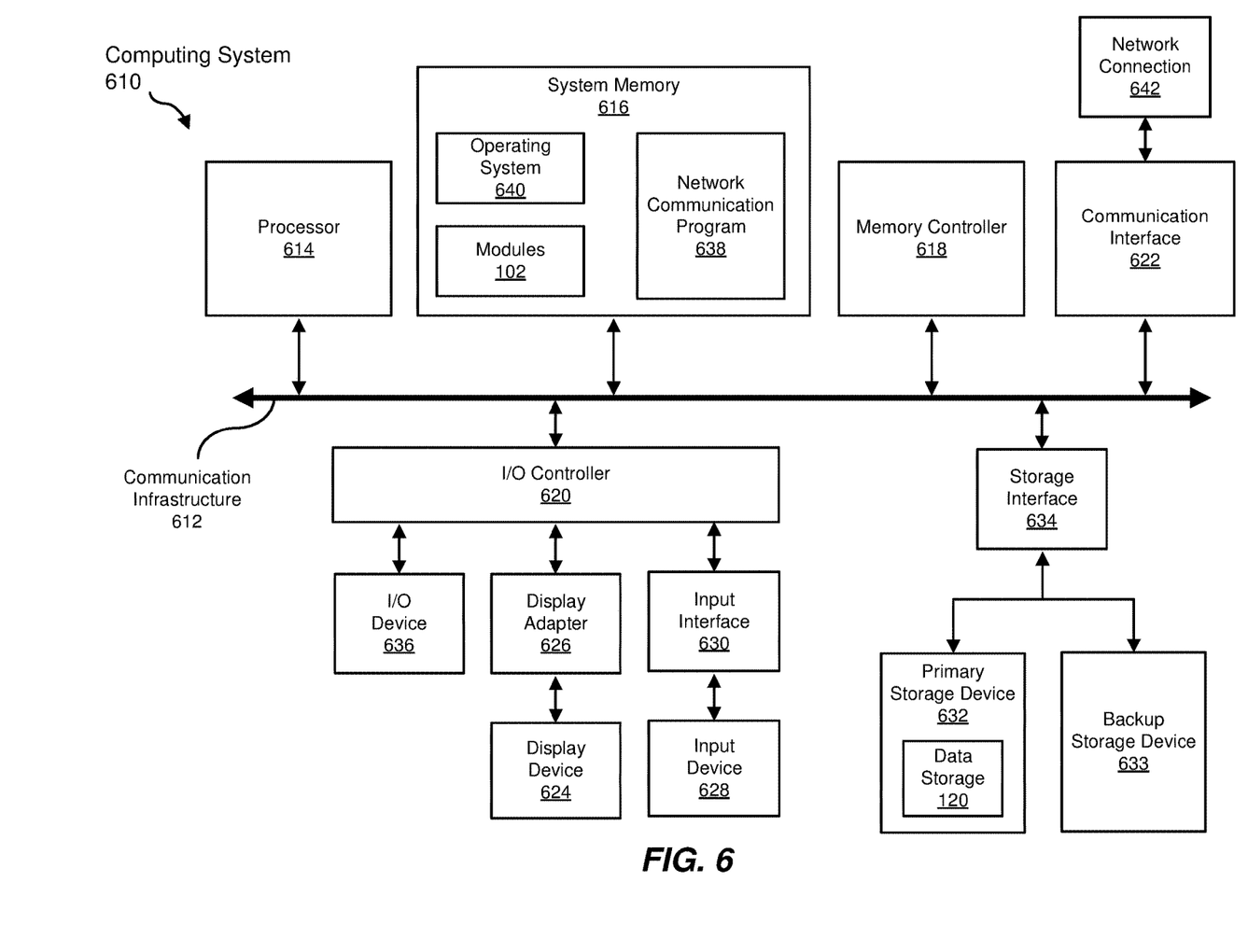
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data storage 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
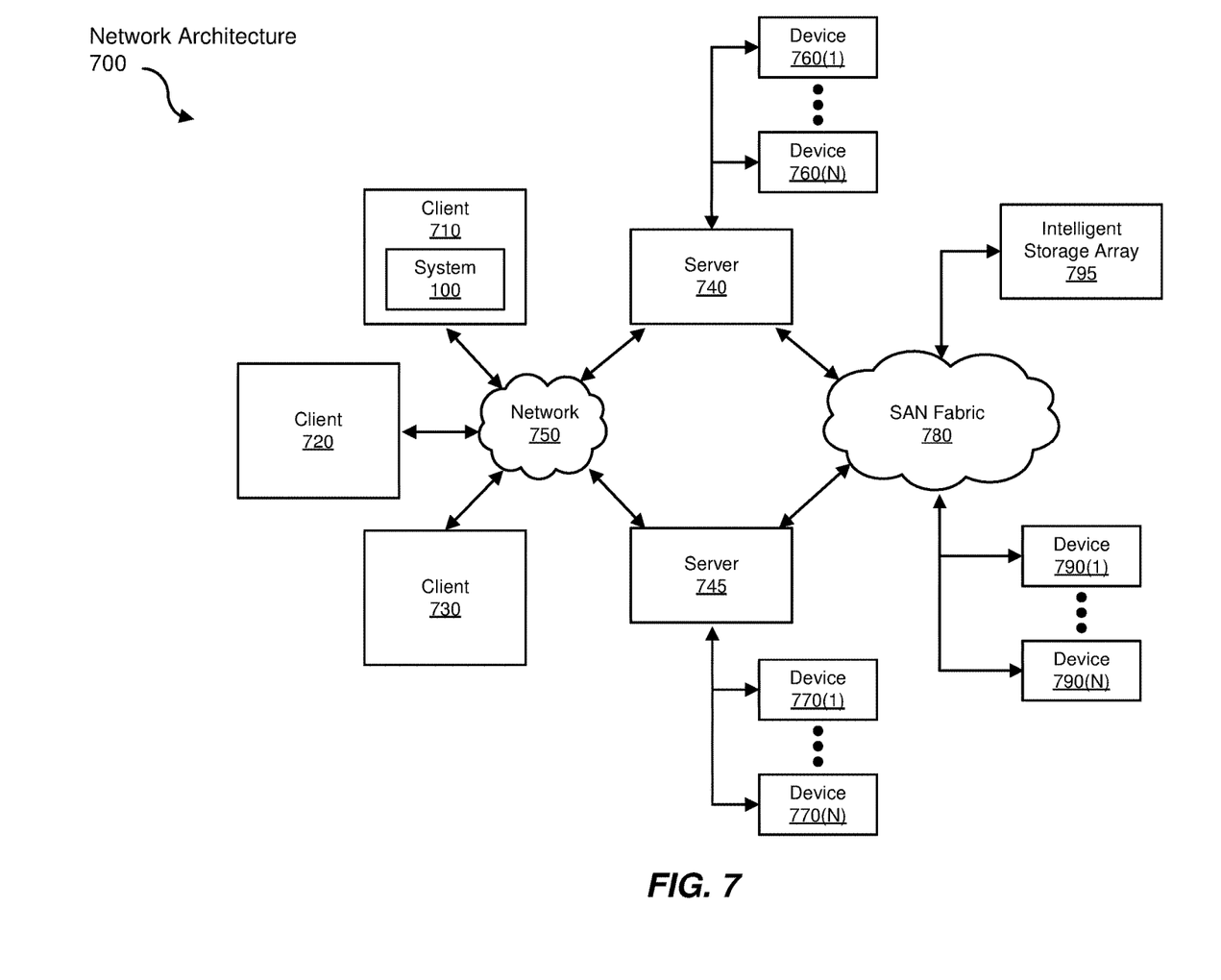
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for providing web tracking transparency to protect user data privacy.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for providing web tracking transparency to protect user data privacy, at least a portion of the method being performed by a computing device comprising at least one processor, the method comprising:

receiving, by the one or more computing devices, a browser request for one or more target websites during a browsing session;

identifying, by the one or more computing devices, a tracking type for one or more website trackers utilized by the target websites during the browsing session, wherein identifying the tracking type for the website trackers comprises:

utilizing a browser extension to detect program code executed by the website trackers in the target websites; and identifying the tracking type based on the detected program code, wherein identifying the tracking type based on the detected program code comprises identifying one or more parties involved in creating a browser fingerprint for identifying a user in the browsing session, wherein the tracking type comprises at least one of a direct tracking type and a tracking sharing type, the direct tracking type comprising a website tracker that utilizes the browser fingerprint for identifying the user in one or more subsequent browser requests, the tracking sharing type comprising identifiers shared by the website trackers utilized by the target websites with at least other website tracker for at least one other website;

extracting, by the one or more computing devices, an information category for the target websites utilizing the website trackers during the browsing session, the information category comprising one of a plurality of different website categories associated with content accessed by a user on the target websites;

detecting, by the one or more computing devices, text patterns shared between the target websites in a common information category, the common information category comprising a website category from the plurality of different website categories that is shared by the target websites;

determining, by the one or more computing devices, information collected about the user by the website trackers during the browsing session by combining the tracking type for the website trackers, the information category for the target website, and the text patterns; and performing, by the one or more computing devices, a security action that protects against unsolicited website tracking in future browsing sessions by providing the information collected by the website trackers during the browsing session to the user.

2. The computer-implemented method of claim 1, wherein utilizing the browser extension comprises managing one or more application programming interfaces (APIs) accessible to the browser extension.

3. The computer-implemented method of claim 1, wherein identifying the tracking type based on the detected program code further comprises identifying one or more parties involved in creating a browser cookie for identifying the user.

4. The computer-implemented method of claim 1, wherein identifying the tracking type based on the detected program code further comprises identifying a shared identifier between the website trackers for the target websites and another website tracker for at least one other website.

5. The computer-implemented method of claim 4, wherein identifying the shared identifier comprises tracking a cookie flow between a web browser receiving the browser request and a server during the browsing session.

6. The computer-implemented method of claim 4, wherein the at least one other website comprises a website that is not directly loaded by the user during the browsing session.

7. The computer-implemented method of claim 1, wherein detecting the text patterns comprises identifying one or more terms utilized in content accessed by the user on the target websites within the common information category.

8. The computer-implemented method of claim 1, wherein performing the security action comprises generating a web tracking transparency report including the at least one of the direct tracking type and the tracking sharing type, the information category, and the text patterns for the target websites.

9. A system for providing web tracking transparency to protect user data privacy, the system comprising:
- at least one physical processor;
- physical memory comprising computer-executable instructions and one or more modules that, when executed by the physical processor, cause the physical processor to:
  - receive, by a receiving module, a browser request for one or more target websites during a browsing session;
  - identify, by an identification module, a tracking type for one or more website trackers utilized by the target websites during the browsing session, wherein the identification module identifies the tracking type for the website trackers by:
    - utilizing a browser extension to detect program code executed by the website trackers in the target websites; and
    - identifying the tracking type based on the detected program code, wherein identifying the tracking type based on the detected program code comprises identifying one or more parties involved in creating a browser fingerprint for identifying a user in the browsing session, wherein the tracking type comprises at least one of a direct tracking type and a tracking sharing type, the direct tracking type comprising a website tracker that utilizes the browser fingerprint for identifying the user in one or more subsequent browser requests, the tracking sharing type comprising identifiers shared by the website trackers utilized by the target websites with at least other website tracker for at least one other website;
  - extract, by an extraction module, an information category for the target websites utilizing the website trackers during the browsing session, the information category comprising one of a plurality of different website categories associated with content accessed by a user on the target websites;
  - detect, by a detection module, text patterns shared between the target websites in a common information category, the common information category comprising a website category from the plurality of different website categories that is shared by the target websites;
  - determine, by a determining module, information collected about the user by the website trackers during the browsing session by combining the tracking type for the website trackers, the information category for the target website, and the text patterns; and
  - perform, by a security module, a security action that protects against unsolicited website tracking in future browsing sessions by providing the information collected by the website trackers during the browsing session to the user.

10. The system of claim 9, wherein the browser extension is utilized by managing one or more application programming interfaces (APIs) accessible to the browser extension.

11. The system of claim 9, wherein the tracking type is further identified by identifying one or more parties involved in creating a browser cookie for identifying the user.

12. The system of claim 9, wherein the tracking type is further identified by identifying a shared identifier between the website trackers for the target websites and another website tracker for at least one other website.

13. The system of claim 12, wherein the shared identifier is identified by tracking a cookie flow between a web browser receiving the browser request and a server during the browsing session.

14. The system of claim 9, wherein the detection module detects the text patterns by identifying one or more terms utilized in content accessed by the user on the target websites within the common information category.

15. The system of claim 9, wherein the security module performs the security action by generating a web tracking transparency report including the at least one of the direct tracking type and the tracking sharing type, the information category, and the text patterns for the target websites.

16. A non-transitory computer-readable medium comprising one or more computer-executable instructions that, when executed by at least one processor of a computing device, cause the computing device to:
- receive a browser request for one or more target websites during a browsing session;
- identify a tracking type for one or more website trackers utilized by the target websites during the browsing session, wherein the tracking type for the website trackers is identified by:
  - utilizing a browser extension to detect program code executed by the website trackers in the target websites; and
  - identifying the tracking type based on the detected program code, wherein identifying the tracking type based on the detected program code comprises identifying one or more parties involved in creating a browser fingerprint for identifying a user in the browsing session, wherein the tracking type comprises at least one of a direct tracking type and a tracking sharing type, the direct tracking type comprising a website tracker that utilizes the browser fingerprint for identifying the user in one or more subsequent browser requests, the tracking sharing type comprising identifiers shared by the website trackers utilized by the target websites with at least other website tracker for at least one other website;
- extract an information category for the target websites utilizing the website trackers during the browsing session, the information category comprising one of a plurality of different website categories associated with content accessed by a user on the target websites;
- detect text patterns shared between the target websites in a common information category, the common information category comprising a website category from the plurality of different website categories that is shared by the target websites;
- determine information collected about the user by the website trackers during the browsing session by combining the tracking type for the website trackers, the information category for the target websites, and the detected text patterns; and
- perform a security action that protects against unsolicited website tracking in future browsing sessions by providing the information collected by the website trackers during the browsing session to the user.

17. The non-transitory computer-readable medium of claim 16, wherein the browser extension is utilized by managing one or more application programming interfaces (APIs) accessible to the browser extension.

18. The non-transitory computer-readable medium of claim 16, wherein the one or more computer-executable instructions cause the computing device to further identify the tracking type based on the detected program code by identifying one or more parties involved in creating a browser cookie for identifying the user.

19. The non-transitory computer-readable medium of claim 16, wherein the one or more computer-executable instructions cause the computing device to further identify the tracking type based on the detected program code by identifying a shared identifier between the website trackers for the target websites and another website tracker for at least one other website.

20. The non-transitory computer-readable medium of claim 16, wherein the one or more computer-executable instructions cause the computing device to perform the security action by generating a web tracking transparency report including the at least one of the direct tracking type and the tracking sharing type, the information category, and the text patterns for the target websites.

\* \* \* \* \*